(12) United States Patent
Palmer, Jr. et al.

(10) Patent No.: US 8,765,901 B2
(45) Date of Patent: *Jul. 1, 2014

(54) SPANDEX COMPOSITIONS FOR HIGH SPEED SPINNING

(75) Inventors: Charles F. Palmer, Jr., Waynesboro, VA (US); Gary A. Lodoen, Waynesboro, VA (US)

(73) Assignee: Invista North America S.ár.l., Wilmington, DE (US)

( * ) Notice: Subject to any disclaimer, the term of this patent is extended or adjusted under 35 U.S.C. 154(b) by 590 days.

This patent is subject to a terminal disclaimer.

(21) Appl. No.: 11/429,897

(22) Filed: May 8, 2006
(Under 37 CFR 1.47)

(65) Prior Publication Data

US 2006/0270821 A1    Nov. 30, 2006

Related U.S. Application Data

(60) Provisional application No. 60/594,811, filed on May 9, 2005, provisional application No. 60/738,733, filed on Nov. 22, 2005, provisional application No. 60/738,734, filed on Nov. 22, 2005.

(51) Int. Cl.
| | | |
|---|---|---|
| C08G 18/48 | (2006.01) | |
| C08G 18/10 | (2006.01) | |
| C08G 18/32 | (2006.01) | |
| C08G 18/76 | (2006.01) | |

(52) U.S. Cl.
USPC ............... 528/61; 528/64; 528/76; 528/906

(58) Field of Classification Search
USPC ..................... 528/61, 65, 68, 76, 906, 64
See application file for complete search history.

(56) References Cited

U.S. PATENT DOCUMENTS

| | | | |
|---|---|---|---|
| 3,425,999 A | | 2/1969 | Axelrod |
| 4,120,850 A | * | 10/1978 | Pechhold ........................ 528/66 |
| 4,139,567 A | | 2/1979 | Pruckmayr |
| 4,153,786 A | | 5/1979 | Pruckmayr |
| 4,163,115 A | | 7/1979 | Heinsohn et al. |
| 4,224,432 A | | 9/1980 | Pechhold et al. |
| 4,383,100 A | * | 5/1983 | Pechhold ........................ 528/76 |
| 4,568,775 A | | 2/1986 | Aoshima et al. |
| 4,658,065 A | | 4/1987 | Aoshima et al. |
| 5,162,387 A | | 11/1992 | Abel et al. |
| 5,340,902 A | | 8/1994 | Smith et al. |
| 5,879,799 A | | 3/1999 | Yosizato et al. |
| 5,905,133 A | | 5/1999 | Muller et al. |
| 6,020,451 A | | 2/2000 | Fishback et al. |
| 6,403,216 B1 | | 6/2002 | Doi et al. |
| 6,639,041 B2 | | 10/2003 | Nishikawa et al. |
| 6,916,896 B2 | | 7/2005 | Selling et al. |
| 8,420,765 B2 | * | 4/2013 | Palmer, Jr. ........................ 528/61 |
| 2002/0193550 A1 | | 12/2002 | Nishikawa et al. |
| 2003/0166821 A1 | | 9/2003 | Pruckmayr et al. |
| 2004/0068080 A1 | * | 4/2004 | Liu et al. ........................ 528/61 |
| 2004/0225101 A1 | * | 11/2004 | Selling et al. ................... 528/61 |

FOREIGN PATENT DOCUMENTS

| | | | |
|---|---|---|---|
| EP | 4356 | * | 10/1979 |
| EP | 371736 | * | 6/1990 |
| EP | 1236757 A1 | | 9/2005 |
| JP | H10-77323 | | 3/1998 |
| JP | 2001-098423 | | 4/2001 |
| JP | 2002-155421 | | 5/2002 |
| JP | 2004-008324 | | 1/2004 |
| JP | 2004-215686 | | 8/2004 |
| JP | 2004-218096 | | 8/2004 |
| WO | WO2004/041891 A1 | | 5/2004 |
| WO | WO2004/041892 A1 | | 5/2004 |
| WO | WO2004/041893 A1 | | 5/2004 |
| WO | WO2004/042135 A1 | | 5/2004 |
| WO | WO2004/074341 A1 | | 9/2004 |
| WO | WO2004/074343 A1 | | 9/2004 |

OTHER PUBLICATIONS

S. Siggia, "Quantitative Organic Analysis via Functional Group", 3rd Edition, Wiley & Sons, New York, pp. 559-561 (1963).
ASTM D 2731-72.

* cited by examiner

Primary Examiner — Rabon Sergent
(74) Attorney, Agent, or Firm — Christina W. Geerlof

(57) ABSTRACT

A spandex comprising a polyurethane or polyurethaneurea reaction product of at least one diisocyanate compound and a poly(tetramethylene-co-ethyleneether) glycol comprising constituent units derived by copolymerizing tetrahydrofuran and ethylene oxide wherein the percentage of ethylene ether moieties is from about 16 to about 70 mole percent with at least one chain extender selected from the group consisting of diamines and diols and at least one chain terminator wherein the spandex is spun at a speed in excess of about 750 meters per minute.

19 Claims, No Drawings

SPANDEX COMPOSITIONS FOR HIGH SPEED SPINNING

CROSS-REFERENCE TO RELATED APPLICATIONS

This application claims benefit of priority from Provisional Application No. 60/738,733, filed Nov. 22, 2005, from Provisional Application No. 60/594,811, filed May 9, 2005, and from Provisional Application No. 60/738,734, filed Nov. 22, 2005. This application hereby incorporates by reference Provisional Application No. 60/738,733 and Provisional Application No. 60/738,734 in their entireties. This application relates to commonly-assigned applications filed concurrently on May 8, 2006 as U.S. Ser. Nos. 11/429,754, 11/431,191 (now U.S. Pat. No. 8,420,765), U.S. Ser. No. 11/429,848 and 11/429,850.

BACKGROUND OF THE INVENTION

1. Field of the Invention

This invention relates to new spandex compositions comprising poly(tetramethylene-co-ethyleneether) glycols comprising constituent units derived by copolymerizing tetrahydrofuran and ethylene oxide, wherein the portion of the units derived from ethylene oxide is present in the poly(tetramethylene-co-ethyleneether) glycol from about 16 to about 70 mole percent and wherein the spandex filaments are spun at high speed, typically greater than 750 meters per minute.

2. Description of the Related Art

Poly(tetramethylene ether) glycols, also known as polytetrahydrofuran or homopolymers of tetrahydrofuran (THF, oxolane) are well known for their use in soft segments in polyurethaneureas. Poly(tetramethylene ether) glycols impart superior dynamic properties to polyurethaneurea elastomers and fibers. They possess very low glass transition temperatures, but have crystalline melt temperatures above room temperature. Thus, they are waxy solids at ambient temperatures and need to be kept at elevated temperatures to prevent solidification.

Copolymerization with a cyclic ether has been used to reduce the crystallinity of the polytetramethylene ether chains. This lowers the polymer melt temperature of the copolyether glycol and at the same time improves certain dynamic properties of the polyurethaneurea that contains such a copolymer as a soft segment. Among the comonomers used for this purpose is ethylene oxide, which can lower the copolymer melt temperature to below ambient, depending on the comonomer content. Use of poly(tetramethylene-co-ethyleneether) glycols may also improve certain dynamic properties of polyurethaneureas, such as elongation at break and low temperature performance, which is desirable for some end uses.

Poly(tetramethylene-co-ethyleneether) glycols are known in the art. Their preparation is described in U.S. Pat. Nos. 4,139,567 and 4,153,786. Such copolymers can be prepared by any of the known methods of cyclic ether polymerization, such as those described in "Polytetrahydrofuran" by P. Dreyfuss (Gordon & Breach, N.Y. 1982), for example. Such polymerization methods include catalysis by strong proton or Lewis acids, heteropoly acids, and perfluorosulfonic acids or acid resins. In some instances it may be advantageous to use a polymerization promoter, such as a carboxylic acid anhydride, as described in U.S. Pat. No. 4,163,115. In these cases, the primary polymer products are diesters, which then need to be hydrolyzed in a subsequent step to obtain the desired polymeric glycols.

Poly(tetramethylene-co-ethyleneether) glycols offer advantages over poly(tetramethylene ether) glycols in terms of certain specific physical properties. At ethyleneether contents above 20 mole percent, the poly(tetramethylene-co-ethyleneether) glycols are moderately viscous liquids at room temperature and have a lower viscosity than poly(tetramethylene ether) glycols of the same molecular weight at temperatures above the melting point of poly(tetramethylene ether) glycols. Certain physical properties of the polyurethanes or polyurethaneureas prepared from poly(tetramethylene-co-ethyleneether) glycols surpass the properties of those polyurethanes or polyurethaneureas prepared from poly(tetramethylene ether) glycols.

Spandex based on poly(tetramethylene-co-ethyleneether) glycols is also known in the art. For example, U.S. Pat. No. 4,224,432 to Pechhold et al. discloses the use of poly(tetramethylene-co-ethyleneether) glycols with low cyclic ether content to prepare spandex and other polyurethaneureas. Pechhold teaches that ethyleneether levels above 30 percent are preferred. Pechhold does not teach the use of coextenders, though it discloses that mixtures of amines may be used.

U.S. Pat. No. 4,658,065 to Aoshima et al. discloses the preparation of several THF copolyethers via the reaction of THF and polyhydric alcohols using heteropolyacid catalysts. Aoshima also discloses that copolymerizable cyclic ethers, such as ethylene oxide, may be included with the THF in the polymerization process. Aoshima discloses that the copolyether glycols may be used to prepare spandex, but contains no examples of spandex from poly(tetramethylene-co-ethyleneether) glycols.

U.S. Pat. No. 3,425,999 to Axelrood et al. discloses the preparation of polyether urethaneureas from poly(tetramethylene-co-ethyleneether) glycols for use in oil resistance and good low temperature performance. The poly(tetramethylene-co-ethyleneether) glycols have ethyleneether content ranging from 20 to 60 percent by weight (equivalent to 29 to 71 mole percent). Axelrood does not disclose the use of these urethaneureas in spandex. Axelrood discloses that "the chain extenders most useful in this invention are diamines selected from the group consisting of primary and secondary diamines and mixtures thereof." Axelrood further discloses that "the preferred diamines are hindered diamines, such as dichlorobenzidine and methylene bis(2-chloroaniline)." Use of ethylene diamine is not disclosed.

U.S. Pat. No. 6,639,041 to Nishikawa et al. discloses fibers having good elasticity at low temperature that contain polyurethaneureas prepared from polyols containing copolyethers of THF, ethylene oxide, and/or propylene oxide, diisocyanates, and diamines and polymers solvated in organic solvents. Nishikawa teaches that these compositions have improved low temperature performance over standard homopolymer spandexes. Nishikawa also teaches that "above about 37 mole % ethyleneether content in the copolyether glycol, unload power at low elongations is unacceptably low, elongation-at-break declines, and set rises, though very slightly." The examples in Nishikawa show that as the mole percent of ethylene ether moiety in the copolyether increases from 22 to 31 to 37 mole percent, the elongation at break rises, but upon increasing to 50 mole percent, the elongation at break then drops. In contrast, the spandex of the present invention exhibits a trend of increasing elongation at break as mole percent of ethylene ether moiety in the copolyether increases from 27 to 49 mole percent. All of the examples in this patent were spun at 650 meters/min. or less.

Spinning spandex faster to make more fiber in a given amount of time and thus reduce manufacturing cost is obvious to any fiber producer, but the spinning speed is limited by the negative effect on some of the fiber properties. It is well known to those skilled in the art that increasing the spinning speed of a spandex composition will reduce its elongation and raise its load power compared to the same spandex spun at a lower speed. Thus, the faster a spandex fiber is spun the more the elongation is reduced and the load power is increased, resulting in reduced draftability of the fiber. Reduced draftability results in requiring more spandex to be used in garment construction and thus increases the cost of garment manufacture. Therefore, it is common practice to slow spinning speeds in order to increase the elongation and reduce the load power of a spandex in order to increase its draftability in circular knitting and other spandex processing operations.

One approach to increasing productivity based on spinning techniques is disclosed in U.S. Pat. No. 6,916,896 to Selling et al. Selling describes using polyurethaneurea compositions with mixed diisocyanates to increase polymer solution solubility so that a higher solids polyurethaneurea solution may be spun. Even though higher spinning speeds are not used, productivity as measured by weight of spandex yarn produced in a given time is increased. The polyurethaneureas of the present invention also have high solution solubility without mixed diisocyanates and have much higher productivities than Selling.

Yet another approach to increased productivity through optimal spinning conditions is disclosed in JP2002-155421A "Dry-Spinning Process." JP2002-155421A discloses a method for increasing productivity in dry spinning polyurethanes. This method is based on adjusting cell spinning conditions to avoid the upward flow of drying gas in the spinning cell and avoiding threadline lateral instability. The two examples of JP2002-155421A both employ poly(tetramethylene ether) glycol-based spandex. JP2002-155421A does not disclose the types of spandexes suitable for the invention. The process of the present invention appears to be independent of spinning cell conditions beyond those necessary to produce a suitably dry fiber (e.g., 0 to 0.5 percent dimethylacetamide solvent remaining in the fiber). In addition, no additives are necessary.

The applicants have observed that spandex with poly(tetramethylene-co-ethyleneether) glycols having from about 16 to about 70 mole percent, for example from greater than about 37 to about 70 mole percent, of its constituent units derived from ethylene oxide as the soft segment base material and which is also spun at high speeds, i.e., greater than 750 meters/min., provides improved physical properties over other spandexes spun at similarly high speeds. Spandex based on other copolyether glycols such as poly(tetramethylene-co-2-methyltetramethyleneether) or polyester glycols such as the copolyester of ethylene glycol, 1,4-butylene glycol and adipic acid also have low load power. However, these spandexes also generally have low tenacity or low elongation or both that limits their ability to be spun at speeds in excess of 1000 meters/min.

The poly(tetramethylene-co-ethyleneether) glycol-based spandex of the present invention possesses the combination of low load power, high elongation, and adequate tenacity that allows it to be spun at speeds in excess of 1300 meters/min., producing a fiber with excellent draftability in circular knitting operations. In addition, the spandex of the present invention shows a desirable reduction in shrinkage in hot wet processing when it is spun at windup speeds greater than 1000 meters/min.

SUMMARY OF THE INVENTION

The present invention relates to spandex comprising a polyurethane or polyurethaneurea reaction product of: (a) a poly(tetramethylene-co-ethyleneether) glycol comprising constituent units derived by copolymerizing tetrahydrofuran and ethylene oxide wherein the portion of units derived from ethylene oxide is present in the poly(tetramethylene-co-ethyleneether) glycol is from about 16 to about 70 mole percent, for example from greater than about 37 to about 70 mole percent, (b) at least one diisocyanate, (c) at least one chain extender selected from the group consisting of diamines and diols, and wherein the spandex is spun at a speed in excess of about 750 meters per minute. In one aspect of this invention, the polyurethane or polyurethaneurea reaction product of the above spandex additionally comprises one or more polymeric glycols.

The present invention also relates to a process for preparing the above spandex comprising: (a) contacting a poly(tetramethylene-co-ethylene ether) glycol wherein the portion of units derived from ethylene oxide is present in the poly(tetramethylene-co-ethyleneether) glycol is from about 16 to about 70 mole percent, for example from greater than about 37 to about 70 mole percent, with at least one diisocyanate to form a capped glycol, (b) dissolving the capped glycol in a solvent, (c) contacting the solution of the capped glycol of (b) with at least one diamine or diol chain extender, and (d) spinning the solution of (c) so that the filaments are spun at a speed in excess of 750 meters per minute to form the spandex.

DETAILED DESCRIPTION OF THE INVENTION

The invention relates to new spandex compositions prepared at high spinning speeds, which improve some of the desirable properties of spandex fiber while minimizing the negative effect of high speed spinning on other properties. Assuming all other factors are held constant, the cost of manufacturing these fibers is reduced proportionally to the increase in spinning speed due to the increased spinning productivity and lowered fixed cost. The properties that are improved are retractive force (i.e., higher unload power), tenacity, and hot wet creep (i.e., reduced shrinkage upon treatment with hot water). The spandex compositions of the present invention comprise polyurethanes and polyurethaneureas based on poly(tetramethylene-co-ethyleneether) glycols. Poly(tetramethylene-co-ethyleneether) glycols are of value as "soft segments" in polyurethane and polyurethaneurea polymers.

The segmented polyurethanes or polyurethaneureas of this invention are made from a poly(tetramethylene-co-ethyleneether) glycol and, optionally, a polymeric glycol, at least one diisocyanate, and a difunctional chain extender. The poly (tetramethylene-co-ethyleneether) glycol or glycol mixture is first reacted with at least one diisocyanate to form an NCO-terminated prepolymer (a "capped glycol"), which is then dissolved in a suitable solvent, such as dimethylacetamide, dimethylformamide, or N-methylpyrrolidone, and then reacted with a difunctional chain extender. Polyurethanes are formed when the chain extenders are diols. Polyurethaneureas, a sub-class of polyurethanes, are formed when the chain extenders are diamines. In the preparation of a polyurethaneurea polymer which can be spun into spandex, the glycols are extended by sequential reaction of the hydroxy end groups with diisocyanates and one or more diamines. In each case, the glycols must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

The poly(tetramethylene-co-ethyleneether) glycols used in making the polyurethanes and polyurethaneureas of the present invention can be made by the method disclosed in U.S. Pat. No. 4,139,567 to Pruckmayr using a solid perfluorosulfonic acid resin catalyst. Alternatively, any other acidic cyclic ether polymerization catalyst may be used to produce these poly(tetramethylene-co-ethyleneether) glycols, for example, heteropoly acids. The heteropoly acids and their salts useful in the practice of this invention can be, for example, those catalysts used in the polymerization and copolymerization of cyclic ethers as described in U.S. Pat. No. 4,658,065 to Aoshima et al. These polymerization methods may include the use of additional promoters, such as acetic anhydride, or may include the use of chain terminator molecules to regulate molecular weight.

The poly(tetramethylene-co-ethyleneether) glycols used in making the polyurethanes and polyurethaneureas of the present invention can comprise constituent units derived by copolymerizing tetrahydrofuran and ethylene oxide, wherein the portion of units derived from ethylene oxide (ethylene ether moieties) is present in the poly(tetramethylene-co-ethyleneether) glycol from about 16 to about 70 mole percent, for example from greater than about 37 to about 70 mole percent, or greater than about 37 to about 55 mole percent, or greater than about 37 to about 50 mole percent. Optionally, the poly(tetramethylene-co-ethyleneether) glycols used in making the polyurethanes or polyurethaneureas of the present invention can comprise constituent units derived by copolymerizing tetrahydrofuran and ethylene oxide, wherein the portion of units derived from ethylene oxide (ethylene ether moieties) is present in the poly(tetramethylene-co-ethyleneether) glycol is from about 40 to about 70 mole percent, or about 40 to 55 mole percent, or about 40 to 50 mole percent. The percentage of units derived from ethylene oxide present in the glycol is equivalent to the percent of ethyleneether moieties present in the glycol.

The poly(tetramethylene-co-ethyleneether) glycols used in making the polyurethanes and polyurethaneureas of the present invention can have an average molecular weight of about 650 Dalton to about 4000 Dalton. Higher poly(tetramethylene-co-ethyleneether) glycol molecular weight can be advantageous for selected physical properties, such as elongation.

The poly(tetramethylene-co-ethyleneether) glycols used in making the polyurethanes and polyurethaneureas of the present invention can include small amounts of units derived from chain terminator diol molecules, especially non-cyclizing diols. Non-cyclizing diols are defined as di-alcohols that will not readily cyclize to form a cyclic ether under the reaction conditions. These non-cyclizing diols can include ethylene glycol, 1,2-propylene glycol, 1,3-propylene glycol, 1,4-butynediol, 2,2-dimethyl-1,3-propanediol, and water.

Poly(tetramethylene-co-ethyleneether) glycols which optionally comprise at least one additional component, such as 3-methyltetrahydrofuran, the ether derived from 1,3-propanediol, or other diols incorporated in small amounts as molecular weight control agents, can also be used in making the polyurethanes and polyurethaneureas of the present invention and are included in the meaning of the term "poly (tetramethylene-co-ethyleneether) or poly(tetramethylene-co-ethyleneether) glycol." The at least one additional component may be a comonomer of the polymeric glycol or it may be another material that is blended with the poly(tetramethylene-co-ethyleneether) glycol. The at least one additional component may be present to the extent that it does not detract from the beneficial aspects of the invention.

Polymeric glycols that can be used in making the polyurethanes or polyurethaneureas of the present invention can have an average molecular weight of about 650 Dalton to about 4000 Dalton. Useful polymeric glycols include poly(tetramethylene ether) glycols, poly(tetramethylene-co-2-methyltetramethyleneether) glycols, poly(ethylene ether) glycols, poly (propylene ether) glycols, polycarbonate glycols, and polyester glycols, or combinations of such glycols. The polymeric glycol can optionally comprise at least one additional component, such as another comonomer of the polymeric glycol or it may be another material that is blended with the polymeric glycol, and such options are included in the meaning of the term "polymeric glycol." The at least one additional component may be present as long as it does not detract from the beneficial aspects of the invention. When the polymeric glycol is a polyester glycol, the polyester glycol is selected from the group consisting of reaction products of (i) ethylene glycol, propylene glycol, butylene glycol, 2,2-dimethyl-1,3-propanediol, and mixtures thereof, and (ii) terephthalic acid, succinic acid, adipic acid, azelaic acid, sebacic acid, and dodecanedioic acid, and mixtures thereof.

When the poly(tetramethylene-co-ethyleneether) glycol is blended with a polymeric glycol which is not poly(ethylene ether) glycol, the combined poly(tetramethylene-co-ethyleneether) glycol and the polymeric glycol may have an overall percentage of units derived from ethylene oxide which is less than or equal to, for example, about 40 mole percent, or about 35 mole percent, or about 30 mole percent. When the poly(tetramethylene-co-ethyleneether) glycol is blended with poly(ethylene ether) glycol, the combined poly(tetramethylene-co-ethyleneether) glycol and the poly(ethylene ether) glycol may have an overall percentage of units derived from ethylene oxide from about 35 to about 70 mole percent, for example from about 37 to about 70 mole percent, or from about 40 to about 65 mole percent. Whether the polymeric glycol is poly(ethylene ether) glycol or another polymeric glycol, in the blend the poly(tetramethylene-co-ethyleneether) glycol and the polymeric glycol are each present in at least 10 mole percent of the sum of the moles of poly (tetramethylene-co-ethyleneether) glycol and the moles of polymeric glycol.

Diisocyanates that can be used include, but are not limited to, 1-isocyanato-4-[(4-isocyanatophenyl)methyl]benzene, 1-isocyanato-2-[(4-cyanatophenyl)methyl]benzene, bis(4-isocyanatocyclohexyl)methane, 5-isocyanato-1-(isocyanatomethyl)-1,3,3-trimethylcyclohexane, 1,3-diisocyanato-4-methyl-benzene, 2,2'-toluenediisocyanate, 2,4'-toluenediisocyanate, and mixtures thereof. Particularly preferred diisocyanates are 1-isocyanato-4-[(4-isocyanatophenyl)methyl]benzene, 1-isocyanato-2-[(4-cyanatophenyl)methyl]benzene, and mixtures thereof. The most preferred diisocyanate is 1-isocyanato-4-[(4-isocyanatophenyl)methyl]benzene.

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy)benzene, and 1,4-butanediol and mixtures thereof.

When a polyurethaneurea is desired, the chain extender is a diamine. Examples of such diamines that may be used include, but are not limited to hydrazine, ethylene diamine, 1,2-propanediamine, 1,3-propanediamine, 1,2-butanediamine(1,2-diaminobutane), 1,3-butanediamine(1,3-diaminobutane), 1,4-butanediamine(1,4-diaminobutane), 1,3-diamino-2,2-dimethylbutane, 4,4'-methylene-biscyclohexylamine, 1-amino-3,3,5-trimethyl-5-aminomethylcyclohexane, 1,6-hexanediamine, 2,2-dimethyl-1,3-diaminopropane, 2,4-diamino-1-methylcyclohexane, N-methylaminobis(3-propylamine), 2-methyl-1,5-pentanediamine, 1,5-diaminopentane, 1,4-cyclohexanediamine, 1,3-diamino-4-methylcyclohexane, 1,3-cyclohexane-diamine, 1,1-methylene-bis(4,4'-diaminohexane), 3-aminomethyl-3,5,5-trimethylcyclohexane, 1,3-pentanediamine (1,3-diaminopentane), m-xylylene diamine, and mixtures thereof.

Optionally, a chain terminator, for example diethylamine, cyclohexylamine, n-hexylamine, or a monofunctional alcohol chain terminator such as butanol, can be used to control the molecular weight of the polymer. Additionally, a higher functional alcohol "chain brancher" such as pentaerythritol, or a trifunctional "chain brancher," such as diethylenetriamine, may be used to control solution viscosity.

The polyurethanes and polyurethaneureas of the present invention may be used in any application where polyurethanes or polyurethaneureas of this general type are employed, but are of special benefit in fabricating articles which require high elongation, low modulus, or good low temperature properties when in use. They are of particular benefit in fabricating spandex, elastomers, flexible and rigid foams, coatings (both solvent and water-based), dispersions, films, adhesives, and shaped articles.

As used herein and unless otherwise indicated, the term "spandex" means a manufactured fiber in which the fiber-forming substance is a long chain synthetic polymer comprised of at least 85 percent by weight of a segmented polyurethane or polyurethaneurea. Spandex is also referred to as elastane.

The spandex of the present invention can be used to make knit and woven stretch fabrics, and garments or textile articles comprising such fabrics. Stretch fabric examples include circular, flat, and warp knits, and plain, twill, and satin wovens. The term "garment," as used herein, refers to an article of clothing such as a shirt, pants, skirt, jacket, coat, work shirt, work pants, uniform, outerwear, sportswear, swimsuit, bra, socks, and underwear, and also includes accessories such as belts, gloves, mittens, hats, hosiery, or footwear. The term "textile article," as used herein, refers to an article comprising fabric, such as a garment, and further includes such items as sheets, pillowcases, bedspreads, quilts, blankets, comforters, comforter covers, sleeping bags, shower curtains, curtains, drapes, tablecloths, napkins, wiping cloths, dish towels, and protective coverings for upholstery or furniture.

The spandex of the present invention can be used alone or in combination with various other fibers in wovens, weft (including flat and circular) knits, warp knits, and personal hygiene apparel such as diapers. The spandex can be bare, covered, or entangled with a companion fiber such as nylon, polyester, acetate, cotton, and the like.

Fabrics comprising the spandex of the present invention may also comprise at least one fiber selected from the group consisting of protein, cellulosic, and synthetic polymer fibers, or a combination of such members. As used herein, "protein fiber" means a fiber composed of protein, including such naturally occurring animal fibers as wool, silk, mohair, cashmere, alpaca, angora, vicuna, camel, and other hair and fur fibers. As used herein, "cellulosic fiber" means a fiber produced from tree or plant materials, including for example cotton, rayon, acetate, lyocell, linen, ramie, and other vegetable fibers. As used herein, "synthetic polymer fiber" means a manufactured fiber produced from a polymer built up from chemical elements or compounds, including for example polyester, polyamide, acrylic, spandex, polyolefin, and aramid.

An effective amount of a variety of additives can also be used in the spandex of the invention, provided they do not detract from the beneficial aspects of the invention. Examples include delustrants such as titanium dioxide and stabilizers such as hydrotalcite, a mixture of huntite and hydromagnesite, barium sulfate, hindered phenols, and zinc oxide, dyes and dye enhancers, antimicrobials, antitack agents, silicone oil, hindered amine light stabilizers, UV screeners, and the like.

The spandex of the present invention or the fabric comprising it may be dyed and printed by customary dyeing and printing procedures, such as from an aqueous dye liquor by the exhaust method at temperatures between 20° C. and 130° C., by padding the material comprising the spandex with dye liquors, or by spraying the material comprising the spandex with dye liquor.

Conventional methods may be followed when using an acid dye. For example, in an exhaust dyeing method, the fabric can be introduced into an aqueous dye bath having a pH of between 3 and 9 which is then heated steadily from a temperature of approximately 20° C. to a temperature in the range of 40-130° C. over the course of about 10 to 80 minutes. The dye bath and fabric are then held at temperature in the range of 40 to 130° C. for from 10 to 60 minutes before cooling. Unfixed dye is then rinsed from the fabric. Stretch and recovery properties of the spandex are best maintained by minimal exposure time at temperatures above 110° C. Conventional methods may also be followed when using a disperse dye.

As used herein, the term "washfastness" means the resistance of a dyed fabric to loss of color during home or commercial laundering. Lack of washfastness can result in color loss, sometimes referred to as color bleed, by an article that is not washfast. This can result in a color change in an article which is laundered together with the article that is not washfast. Consumers generally desire fabrics and yarns to exhibit washfastness. Washfastness relates to fiber composition, fabric dyeing and finishing processes, and laundering conditions. Spandex having improved washfastness is desired for today's apparel.

The washfastness properties of the spandex of the present invention may be supported and further enhanced by use of customary auxiliary chemical additives. Anionic syntans may be used to improve the wetfastness characteristics, and can also be used as retarding and blocking agents when a minimal partition of dye is required between the spandex and partner yarn. Anionic sulfonated oil is an auxiliary additive used to retard anionic dyes from spandex or partner fibers that have a stronger affinity for the dye where uniform level dyeing is required. Cationic fixing agents can be used alone or in conjunction with anionic fixing agents to support improved washfastness.

Spandex fiber can be formed from the polyurethane or polyurethaneurea polymer solution of the present invention through fiber spinning processes such as dry spinning or melt spinning. Polyurethaneureas are typically dry-spun or wet-spun when spandex is desired. In dry spinning, a polymer solution comprising a polymer and solvent is metered through spinneret orifices into a spin chamber to form a filament or filaments. Typically, the polyurethaneurea polymer is dry spun into filaments from the same solvent as was used for the polymerization reactions. Gas is passed through the chamber to evaporate the solvent to solidify the filament(s). Filaments are dry spun at a windup speed of at least 550 meters per minute. As used herein, the term "spinning speed" refers to windup speed, which is determined by and is the same as the drive roll speed. Good spinability of spandex filaments is characterized by infrequent filament breaks in the spinning cell and in the wind up. The spandex can be spun as single filaments or can be coalesced by conventional techniques into multi-filament yarns. Each filament is of textile decitex (dtex), in the range of 6 to 25 dtex per filament.

It is well known to those skilled in the art that increasing the spinning speed of a spandex composition will reduce its elongation and raise its load power compared to the same spandex spun at a lower speed. Therefore, it is common practice to slow spinning speeds in order to increase the elongation and reduce the load power of a spandex in order to increase its draftability in circular knitting and other spandex processing operations. However, lowering spinning speed reduces manufacturing productivity.

As spandex fiber is spun faster, some desirable physical properties improve, while other fiber properties simultaneously decline. These properties that decline include reduced elongation, and increased force required to extend the fiber (load power or modulus), generally in proportion to the increase in spinning speed. Both properties reduce the value of the spandex to fabric mill customers. The reduced elongation and increased load power act to reduce the draftability of the fiber and thus increase the amount of spandex required to make an elastified garment. The increased load power can also result in decreased consumer comfort due to increased resistance to stretching. Therefore, a balance must be struck between increasing the fiber spinning speed thereby reducing the producer's manufacturing cost and improving some fiber properties, with minimizing the loss of product value to the customer due to the decline of some of the other desired fiber properties.

The draftability of a spandex yarn can be limited by a number of factors. The draft is limited to the elongation of the yarn unless it is first limited by some other factor. One example of an additional factor is the load power (or modulus). For example, if the knitting needle in a circular knitting machine is limited to five grams of tension in operation, then the spandex fiber draft is limited to the draft produced by five grams of extension force. One favorable aspect of the present invention is that the poly(tetramethylene-co-ethyleneether) glycol-based spandexes retain very high draftability in circular knitting, remaining higher than high quality poly(tetramethylene ether) glycol-based spandex even when the spandex of the invention is wound up at speeds 50 percent higher than the Comparison spandex. This is illustrated in Table 1 below.

Lower load power is desired in most spandex end uses not only because of its positive effect on increased draftability, but also because lower load power in the elastified garment often translates into improved consumer comfort. Higher elongation is similarly desirable not only because of its positive effect on increased draftability, but also because higher elongation in the elastified garment can be translated into higher available stretch in certain garment constructions.

One favorable aspect of the present invention is that spandex based on poly(tetramethylene-co-ethyleneether) glycols (where ethyleneether content is 16 to 70 mole percent) has much higher elongation and lower load power, than poly (tetramethylene ether) glycols-based spandex, when spun at similar speeds and conditions. Poly(tetramethylene ether) glycol-based spandex is not currently spun at much more than about 870 meters per minute (m/min.) due to limitations imposed by the high modulus and reduced elongation. Further increases in spinning speed reduce the draftability and thus the customer value so much that it is of no practical value.

However, when poly(tetramethylene-co-ethyleneether) glycol-based spandex is spun at speeds up to 1300 m/min or more, the load power is increased and the elongation is reduced, but they remain at values better than poly(tetramethylene ether) glycol-based spandex spun at much lower speeds. This is illustrated in Tables 2 and 3 below. For example, all of the spandexes of the invention have lower load power at 100%, 200%, and 300% even when spun at much higher speeds than the Comparison poly(tetramethylene ether) glycol-based spandex spun at 844 m/min. In addition, the elongation of the spandexes of the invention even when spun at much higher speeds remains higher than that of the Comparison poly(tetramethylene ether) glycol-based spandex spun at 844 m/min. The spandex of the present invention may be spun at a speed in excess of 750 m/min., or at a speed in excess of 1000 m/min., or at a speed in excess of 1100 m/min.

Another factor limiting spandex yarn drafting is the tenacity of the yarn, or the stress at the elongation break or resistance to breaking. Breaks in the spandex while knitting limit productivity and increases the garment manufacturing cost. Therefore higher tenacity is valued by the spandex customer up to a point. However, higher tenacity beyond the minimum needed to avoid processing breaks is not valued if another factor is limiting draftability. The inventors have found that higher speed spinning of the spandexes of the invention desirably increases the tenacity. This is also illustrated in Table 3 below.

Increasing the retractive force of a spandex fiber (unload power) is usually desirable because it is this retractive force that pulls together the fabric construction in elastified garments and gives them their desired properties. Increasing the unload power of a spandex can either allow the fabric manufacturer to use less spandex to achieve the desired amount of compression in the fabric, or could allow the spandex manufacturer to spin the spandex in finer deniers with the same retractive force as a larger filament of spandex with lower unload power. The finer denier allows its use in more end uses, especially those with fine denier hard yarns.

Spandex fiber shrinks to some extent when it is exposed to hot water as is usually found in dyeing and finishing processes in garment manufacture. It is desirable to have a low level of shrinkage of the spandex fiber in a garment when it is dyed and finished so that the final fabric shape and size may be maintained as desired. This may be simulated in the laboratory by determining the "hot wet creep," a test designed to simulate the shrinkage of the spandex yarn upon dyeing. As shown in Table 4 below, the spandexes of the present invention have reduced "hot wet creep," as spinning speed is increased.

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and not as restrictive.

As used herein and unless otherwise indicated, the term "DMAc" means dimethylacetamide solvent, the term "% NCO" means weight percent of the isocyanate end groups in a capped glycol, the term "MPMD" means 2-methyl-1,5-pentanediamine, the term "EDA" means 1,2-ethylenediamine, and the term "PTMEG" means poly(tetramethylene ether) glycol.

As used herein, the term "capping ratio" is defined as the molar ratio of diisocyanate to glycol, with the basis defined as 1.0 mole of glycol. Therefore, the capping ratio is typically reported as a single number, the moles of diisocyanate per one mole of glycol. For the polyurethaneureas of the present invention, the preferred molar ratio of diisocyanate to poly (tetramethylene-co-ethylene ether) glycol is about 1.2 to about 2.3. For the polyurethanes of the present invention, the preferred molar ratio of diisocyanate to poly(tetramethylene-co-ethylene ether) glycol is about 2.3 to about 17, preferably about 2.9 to about 5.6.

Materials

THF and PTMEG (TERATHANE® 1800) are available from Invista S. à r. l., Wilmington, Del., USA. NAFION® perfluorinated sulfonic acid resin is available from E.I. DuPont de Nemours and Company, Wilmington, Del., USA.

Analytical Methods

Tenacity is the stress at break in the sixth stretching cycle, or in other words, the resistance of the fiber to breaking at ultimate elongation. Load power is the stress at specified elongations in the first stretching cycle, or in other words, the resistance of the fiber to being stretched to higher elongation. Unload power is the stress at specified elongations in the fifth retraction cycle, or in other words, the retractive force of the fiber at a given elongation after having been cycled to 300 percent elongation five times.

Percent Isocyanate—Percent isocyanate (% NCO) of the capped glycol blends was determined according to the method of S. Siggia, "Quantitative Organic Analysis via Functional Group", 3rd Edition, Wiley & Sons, New York, pages 559-561 (1963) using a potentiometric titration.

Ethyleneether Content—The level of ethyleneether content in the poly(tetramethylene-co-ethyleneether) glycols of the present invention was determined from $^1$H NMR measurements. The sample of poly(tetramethylene-co-ethyleneether) glycol or blend was dissolved in a suitable NMR solvent such as $CDCl_3$ and the $^1$H NMR spectrum obtained. The integral of the combined —$OCH_2$— peaks at 3.7-3.2 ppm was compared to the integral of the combined —C—$CH_2CH_2$—C— peaks from 1.8-1.35 ppm. The —$OCH_2$— peaks come from both ethylene oxide-based linkages (—O—$CH_2CH_2$—O—) and from THF-based linkages (—O—$CH_2CH_2CH_2CH_2$—O—) while the —C—$CH_2CH_2$—C— linkages come from THF only. To find the molar fraction of ethyleneether linkages in the poly(tetramethylene-co-ethyleneether) glycol, the integral of the —C—$CH_2CH_2$—C— peaks was subtracted from the integral of the combined —$OCH_2$— peaks and then that result was divided by the integral of the —$OCH_2$— peaks.

Number Average Molecular Weight—The number average molecular weight of the poly(tetramethylene-co-ethyleneether) glycol was determined by the hydroxyl number method.

Strength and Elastic Properties—The strength and elastic properties of the spandex were measured in accordance with the general method of ASTM D 2731-72. An Instron tensile tester was used to determine tensile properties. Three filaments, a 2-inch (5-cm) gauge length and 0-to-300% elongation cycles were used for each of the measurements "as-is" from the windup, that is, without scouring or other treatment, after 24 hours of aging at approximately 70° F. and 65% relative humidity (+/−2%) in a controlled environment. The samples were cycled five times at a constant elongation rate of 50 cm per minute and then held at 300% extension for 30 seconds after the fifth extension.

Load power, the stress on spandex during initial extension, was measured on the first cycle at 100%, 200%, or 300% extension and is reported in the Tables in grams per denier and is designated "LP1", "LP2", or "LP3", respectively. Unload power, the stress at an extension of 100% or 200% on the fifth unload cycle, is also reported in grams per denier; it is designated as "UP1" or "UP2," respectively. Percent elongation at break ("Elo") and tenacity were measured on the sixth extension cycle using modified Instron grips to which a rubber tape was attached for reduced slippage.

Percent Set—Unless otherwise indicated, percent set was also measured on samples that had been subjected to five 0-300% elongation/relaxation cycles. Percent set ("% SET") was calculated as:

% SET=100($L_f$–$L_o$)/$L_o$ wherein $L_o$ and $L_f$ are the filament (yarn) length, when held straight without tension, before and after the five elongation/relaxation cycles, respectively.

Circular Knit (CK) Draft—In knitting, the spandex stretches (drafts) when it is delivered from the supply package to the carrier plate and in turn to the knit stitch due to the difference between the stitch use rate and the feed rate from the spandex supply package. The ratio of the hard yarn supply rate (meters/min) to the spandex supply rate is normally 2.5 to 4 times (2.5× to 4×) greater, and is known as the machine draft, "MD." This corresponds to spandex elongation of 150% to 300%, or more. As used herein, the term "hard yarn" refers to relatively inelastic yarn, such as polyester, cotton, nylon, rayon, acetate, or wool.

The total draft of the spandex yarn is a product of the machine draft (MD) and the package draft (PD), which is the amount that the spandex yarn is already stretched on the supply package. For a given denier (or decitex), the spandex content in a fabric is inversely proportional to the total draft; the higher the total draft, the lower the spandex content. PR is a measured property called "Percent Package Relaxation" and is defined as 100*(length of yarn on the package−length of relaxed yarn)/(length of yarn on the package). PR typically measures 5 to 15 for the spandex used in circular knit, elastic, single jersey fabrics. Using the measured PR, package draft (PD) is defined as 1/(1−PR/100). Therefore, the total draft (TD) may also be calculated as MD/(1−PR/100). A yarn with 4× machine draft and 5% PR would have a total draft of 4.21×, while a yarn with machine draft of 4× and 15% PR would have a total draft of 4.71×.

For economic reasons, circular knitters will often try to use the minimum spandex content consistent with adequate fabric properties and uniformity. As explained above, increasing spandex draft is a way to reduce content. The main factor that limits draft is the percent elongation to break, so a yarn with high percent elongation to break is the most important factor. Other factors, such as tenacity at break, friction, yarn tackiness, denier uniformity, and defects in yarn can reduce the practical achievable draft. Knitters will provide a safety margin for these limiting factors by reducing draft from the ultimate draft (measured percent elongation at break). They typically determine this "sustainable draft" by increasing draft until knitting breaks reach an unacceptable level, such as 5 breaks per 1,000 revolutions of the knitting machine, then backing off until acceptable performance is regained.

Tension in knitting needles can also be a limiting factor for draft. The feed tension in the spandex yarn is directly related to the total draft of the spandex yarn. It is also a function of the inherent modulus (load power) of the spandex yarn. In order to maintain acceptably low tension in knitting at high draft, it is advantageous for the spandex to have a low modulus (load power).

The ideal yarn for high draftability would therefore have high percent elongation to break, low modulus (load power), adequately high tenacity, low friction and tack, uniform denier, and a low level of defects.

Because of its stress-strain properties, spandex yarn drafts (draws) more as the tension applied to the spandex increases; conversely, the more that the spandex is drafted, the higher the tension in the yarn. A typical spandex yarn path in a circular knitting machine is as follows. The spandex yarn is metered from the supply package, over or through a broken end detector, over one or more change-of-direction rolls, and then to the carrier plate, which guides the spandex to the knitting needles and into the stitch. There is a build-up of tension in the spandex yarn as it passes from the supply package and over each device or roller, due to frictional forces imparted by each device or roller that touches the spandex. The total draft of the spandex at the stitch is therefore related to the sum of the tensions throughout the spandex path.

Residual DMAc in Spandex—The percent DMAc remaining in the spandex samples was determined by using a Duratech DMAc analyzer. A known amount of perclene was used to extract the DMAc out of a known weight of spandex. The amount of DMAc in the perclene was then quantified by measuring the UV absorption of the DMAc and comparing that value to a standardization curve.

Hot-Wet Creep—Hot-wet creep (HWC) is determined by measuring an original length, $L_0$, of a yarn, stretching it to one-and-a-half times its original length ($1.5L_0$), immersing it in its stretched condition for 30 minutes in a water bath maintained at temperature in the range of 97 to 100° C., removing it from the bath, releasing the tension and allowing the sample to relax at room temperature for a minimum of 60 minutes before measuring the final length, $L_f$. The percent hot-wet creep is calculated from the following formula:

$$\% \text{ HWC} = 100 \times [(L_f - L_0)/L_0]$$

Fibers with low % HWC provide superior performance in hot-wet finishing operations, such as dyeing.

capped with 1-isocyanato-4-[(4-isocyanato-phenyl)methyl] benzene at 90° C. for 120 minutes using 100 ppm of a mineral acid as catalyst to give a prepolymer with the molar ratio of diisocyanate to glycol (capping ratio) shown in the table. This capped glycol was then diluted with DMAc solvent, chain extended with EDA, and chain terminated with diethylamine to give a spandex polymer solution. The amount of DMAc used was such that the final spinning solution had 36-38 wt % polyurethaneurea in it, based on total solution weight. The spinning solution was dry-spun into a column provided with dry nitrogen, coalesced, passed around a godet roll and wound up at the speeds listed. Spinning cell temperatures and aspiration gas flow rates were adjusted to result in a residual solvent level of 0.1 to 0.7 percent. The filaments demonstrated good spinability. Fiber properties are presented in Tables 1 through 4.

Comparison Examples "1-5"

PTMEG-Based Spandex

Poly(tetramethyleneether) glycol with an 1800 Dalton average molecular weight was capped with 1-isocyanato-4-[(4-isocyanato-phenyl)methyl]benzene at 90° C. for 90 minutes to give a prepolymer with a molar ratio of diisocyanate to glycol of 1.69. This capped glycol was then diluted with DMAc solvent, chain extended with a mixture of EDA and MPMD in a 90/10 ratio, and chain terminated with diethylamine to give a spandex product similar in composition to a high quality commercial spandex. The amount of DMAc used was such that the final spinning solution contained 35 wt % polyurethaneurea, based on total solution weight. The spinning solution was dry-spun into a column provided with dry nitrogen, coalesced, passed around a godet roll and wound at the speeds listed. The filaments demonstrated good spinability. Fiber properties are presented in Tables 1 through 4.

TABLE 1

| Example | % EO | Capping Ratio | Extender | Glycol MW | Filaments per threadline | Windup Speed (m/min) | PRM (%) | CK Machine Draft | Total Draft |
|---|---|---|---|---|---|---|---|---|---|
| 1 | 27 | 1.63 | 100% EDA | 2010 | 3 | 844 | 14.7 | 4.1 | 4.80 |
| 2 | 27 | 1.63 | 100% EDA | 2010 | 4 | 870 | 19.2 | 4.1 | 5.08 |
| 3 | 27 | 1.63 | 100% EDA | 2010 | 4 | 1100 | 19.5 | 3.8 | 4.72 |
| 4 | 27 | 1.63 | 100% EDA | 2010 | 4 | 1280 | 20.4 | 3.6 | 4.52 |
| 5 | 38 | 1.7 | 100% EDA | 2500 | 4 | 870 | 19.5 | 4.3 | 5.34 |
| 6 | 38 | 1.7 | 100% EDA | 2500 | 4 | 1100 | 21.0 | 4.1 | 5.19 |
| 7 | 38 | 1.7 | 100% EDA | 2500 | 4 | 1280 | 18.7 | 3.7 | 4.55 |
| 8 | 38 | 1.77 | 100% EDA | 2500 | 3 | 844 | 14.0 | 4.1 | 4.77 |
| 9 | 49 | 1.64 | 100% EDA | 2045 | 4 | 870 | 15.8 | 4.5 | 5.34 |
| Comparison Example 1 | 0 | 1.69 | 90/10 EDA/MPMD | 1800 | 3 | 844 | 11.6 | 3.8 | 4.30 |
| Comparison Example 2 | 0 | 1.69 | 90/10 EDA/MPMD | 1800 | 4 | 1100 | 16.8 | 3.4 | 4.09 |

EXAMPLES

Examples 1-31

Ethyleneether-Containing Spandex

Random poly(tetramethylene-co-ethyleneether) glycols with the mole percentage of ethyleneether units and number average molecular weights shown in Tables 1, 2, and 4 were Examination of the data in Table 1 shows several different spandexes with differing ethyleneether contents, capping ratios, glycol molecular weights, filaments per threadline, and windup (spinning) speed with total circular knit draft levels exceeding that of spandex based on poly(tetramethyleneether) glycol. Examples 4 and 7 both have total draft levels exceeding that of Comparison Example 1 spandex even though they were wound up at over 50% higher speed.

TABLE 2

| Example | % EO | Glycol MW | Capping Ratio | Extender | Chlorine resistance additive % | Windup Speed (m/min) | Filaments per threadline | Residual Solvent (%) |
|---|---|---|---|---|---|---|---|---|
| 10 | 38 | 2500 | 1.70 | EDA 100% | 4 | 844 | 3 | 0.17 |
| 11 | 38 | 2500 | 1.70 | EDA 100% | 4 | 1100 | 4 | 0.19 |
| 12 | 38 | 2500 | 1.70 | EDA 100% | 4 | 1280 | 4 | 0.25 |
| 13 | 27 | 2010 | 1.63 | EDA 100% | 4 | 870 | 4 | 0.18 |
| 14 | 27 | 2010 | 1.63 | EDA 100% | 4 | 1100 | 4 | 0.36 |
| 15 | 27 | 2010 | 1.63 | EDA 100% | 4 | 1280 | 4 | 0.36 |
| 16 | 49 | 2049 | 1.64 | EDA 100% | 4 | 870 | 4 | 0.23 |
| 17 | 49 | 2049 | 1.64 | EDA 100% | 4 | 1100 | 4 | 0.21 |
| 18 | 37 | 1885 | 1.60 | EDA 100% | 0 | 844 | 3 | 0.72 |
| 19 | 37 | 1885 | 1.60 | EDA 100% | 0 | 870 | 4 | 0.74 |
| 20 | 37 | 1885 | 1.60 | EDA 100% | 0 | 1100 | 4 | 0.73 |
| 21 | 37 | 1885 | 1.60 | EDA 100% | 0 | 1280 | 4 | 0.82 |
| 22 | 37 | 1885 | 1.72 | 90/10 EDA/MPMD | 0 | 844 | 3 | 0.79 |
| 23 | 37 | 1885 | 1.72 | 90/10 EDA/MPMD | 0 | 1100 | 4 | 0.79 |
| Comparison Example 3 | 0 | 1800 | 1.69 | 90/10 EDA/MPMD | 0 | 870 | 4 | 0.42 |
| Comparison Example 4 | 0 | 1800 | 1.69 | 90/10 EDA/MPMD | 0 | 1100 | 4 | 0.65 |
| Comparison Example 5 | 0 | 1800 | 1.69 | 90/10 EDA/MPMD | 0 | 1280 | 4 | 0.48 |

Table 2 shows the compositional details of several different spandexes varying by ethyleneether contents, glycol molecular weights, capping ratios, extender type, additive amount, windup (spinning) speed filaments per threadline, and residual spinning solvent. All are 44 dtex spun fibers. The filament count affects the drying rate of the fiber; therefore, the amount of residual solvent in the fiber after spinning is given. Drying the fiber to a lower residual solvent level also affects the resulting fiber properties. In general, drying the fiber more will increase the retractive force or unload power. Therefore, examples of a given composition with similar residual solvent were selected for comparison by windup speed.

Table 3 shows the physical properties of the Example fibers from Table 2. Examination of the data in table 3 shows that for each of the Examples and Comparison Example compositions a higher windup speed increases retractive force at both 100% and 200% elongation on the fifth recovery cycle (UP1 and UP2), as well as the load power at 100%, 200%, and 300% elongation on the first elongation cycle (except for Comparison Example 4 that has a higher residual solvent level). Even when spun at 1280 m/min. windup speed, the Examples of the invention have much lower load power and higher elongation than the Comparison Example 3 spandex spun at 870 m/min. Thus it may be seen that the Examples of the invention, when spun at all of these windup speeds, even

TABLE 3

| Example | ELO (%) | SET (%) | TEN (g/den) | UP1 (g/den) | UP2 (g/den) | LP1 (g/den) | LP2 (g/den) | LP3 (g/den) |
|---|---|---|---|---|---|---|---|---|
| 10 | 640 | 22.5 | 0.5384 | 0.0170 | 0.0314 | 0.0530 | 0.0848 | 0.1200 |
| 11 | 632 | 22.5 | 0.6721 | 0.0177 | 0.0336 | 0.0655 | 0.1068 | 0.1567 |
| 12 | 630 | 22.0 | 0.7547 | 0.0182 | 0.0349 | 0.0698 | 0.1151 | 0.1705 |
| 13 | 634 | 26.5 | 0.6557 | 0.0158 | 0.0313 | 0.0706 | 0.1149 | 0.1639 |
| 14 | 587 | 25.9 | 0.7001 | 0.0172 | 0.0341 | 0.0846 | 0.1369 | 0.1983 |
| 15 | 539 | 24.2 | 0.8868 | 0.0175 | 0.0357 | 0.0798 | 0.1431 | 0.2268 |
| 16 | 630 | 26.6 | 0.5483 | 0.0169 | 0.0341 | 0.0653 | 0.1028 | 0.1426 |
| 17 | 546 | 23.3 | 0.6097 | 0.0185 | 0.0377 | 0.0657 | 0.1142 | 0.1701 |
| 18 | 622 | 31.5 | 0.4987 | 0.0156 | 0.0328 | 0.0762 | 0.1134 | 0.1521 |
| 19 | 721 | 33.3 | 0.5000 | 0.0160 | 0.0338 | 0.0941 | 0.1306 | 0.1662 |
| 20 | 611 | 32.5 | 0.5443 | 0.0162 | 0.0343 | 0.1010 | 0.1445 | 0.1909 |
| 21 | 537 | 29.9 | 0.5585 | 0.0178 | 0.0374 | 0.1054 | 0.1596 | 0.2240 |
| 22 | 584 | 30.5 | 0.5577 | 0.0162 | 0.0341 | 0.0813 | 0.1230 | 0.1602 |
| 23 | 528 | 32.2 | 0.5755 | 0.0171 | 0.0365 | 0.1082 | 0.1696 | 0.2443 |
| Comparison Example 3 | 443 | 27.4 | 0.8912 | 0.0170 | 0.0281 | 0.1081 | 0.2170 | 0.4049 |
| Comparison Example 4 | 411 | 25.2 | 0.8701 | 0.0174 | 0.0289 | 0.1179 | 0.2429 | 0.2990 |
| Comparison Example 5 | 397 | 23.9 | 1.0288 | 0.0183 | 0.0317 | 0.1134 | 0.2595 | 0.5548 | those greater than 1000 m/min., may be drafted much further in a circular knitting operation before the tension at the knitting needle or the elongation limits the spandex draft.

TABLE 4

| Example | % EO | Glycol MW | Capping Ratio | Extender | Windup Speed (m/min) | Hot Wet Creep |
|---|---|---|---|---|---|---|
| 24 | 37 | 1900 | 1.60 | 100% EDA | 870 | 16.5 |
| 25 | 37 | 1900 | 1.60 | 100% EDA | 1100 | 15.1 |
| 26 | 37 | 1900 | 1.60 | 100% EDA | 1280 | 13.2 |
| 27 | 49 | 2049 | 1.64 | 100% EDA | 870 | 16.5 |
| 28 | 49 | 2049 | 1.64 | 100% EDA | 1100 | 13.2 |
| 29 | 27 | 2045 | 1.63 | 100% EDA | 870 | 13.2 |
| 30 | 27 | 2045 | 1.63 | 100% EDA | 1100 | 12.9 |
| 31 | 27 | 2045 | 1.63 | 100% EDA | 1280 | 11.7 |
| Comparison Example 1 | 0 | 1800 | 1.69 | 90/10 EDA/MPMD | 844 | 15.6 |

Examination of the data in Table 4 shows that increasing the windup speed of the Examples of the invention reduces the hot wet creep, and may be used to reduce the creep to a level below that of the Comparison spandex.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims.

The invention claimed is:

1. Spandex comprising a polyurethane reaction product of:
   (a) a poly(tetramethylene-co-ethyleneether) glycol consisting of constituent units derived by copolymerizing tetrahydrofuran and ethylene oxide wherein the portion of units derived from ethylene oxide is present in the poly(tetramethylene-co-ethyleneether) glycol from about 50 to about 70 mole percent;
   (b) at least one diisocyanate; and
   (c) at least one diamine chain extender;
   wherein the spandex is spun at a speed in excess of about 750 meters per minute.

2. The spandex of claim 1 wherein the portion of units derived from ethylene oxide is present in the poly(tetramethylene-co-ethyleneether) glycol from about 50 to about 55 mole percent.

3. The spandex of claim 1 wherein the spandex is spun at a speed in excess of about 1000 m/min.

4. The spandex of claim 1 wherein the diisocyanate is selected from the group consisting of 1-isocyanato-4-[(4-isocyanato-phenyl)methyl]benzene, 1-isocyanate-2-[(4-isocyanato-phenyl)methyl]benzene and mixtures thereof.

5. The spandex of claim 1 wherein the chain extender is selected from the group consisting of hydrazine, ethylenediamine, 1,2-propanediamine, 1,3-propanediamine, 1,2-diaminobutane, 1,3-diaminobutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methylcyclohexane, 1,3-cyclohexanediamine, 2-methyl-1,5-pentanediamine, 1,3-pentanediamine, 4,4'-methylene-bis-cyclohexylamine, and mixtures thereof.

6. The spandex of claim 4 wherein the poly(tetramethylene-co-ethyleneether) glycol has a number-average molecular weight of about 650 to about 4000 Dalton and the molar ratio of diisocyanate to poly(tetramethylene-co-ethyleneether) glycol is about 1.2:1 to about 2.3:1.

7. The spandex of claim 5 wherein the diisocyanate is selected from the group consisting of 1-isocyanato-4-[(4-isocyanato-phenyl)methyl]benzene, 1-isocyanato-2-[(4-isocyanato-phenyl)methyl]benzene and mixtures thereof and the molar ratio of diisocyanate to poly(tetramethylene-co-ethyleneether) glycol is about 1.2:1 to about 2.3:1.

8. The spandex of claim 5 wherein the diisocyanate is 1-isocyanato-4-[(4-isocyanato-phenyl)methyl]benzene and the portion of units derived from ethylene oxide is present in the poly(tetramethylene-co-ethyleneether) glycol in an amount of about 50 mole percent.

9. A process for preparing spandex comprising:
   (a) contacting a poly(tetramethylene-co-ethyleneether) glycol consisting of constituent units derived by copolymerizing tetrahydrofuran and ethylene oxide wherein the portion of units derived from ethylene oxide is present in the poly(tetramethylene-co-ethyleneether) glycol from about 50 to about 70 mole percent with at least one diisocyanate to form a capped glycol;
   (b) dissolving the capped glycol in a solvent;
   (c) contacting the solution of the capped glycol of (b) with at least one diamine chain extender; and
   (d) spinning the solution of (c) so that the filaments are spun at a speed in excess of 750 meters per minute to form the spandex.

10. The process of claim 9 wherein the diisocyanate is 1-isocyanato-4-[(4-isocyanato-phenyl)methyl]benzene, the molar ratio of diisocyanate to poly(tetramethylene-co-ethyleneether) glycol is about 1.2:1 to about 2.3:1, and the chain extender is selected from the group consisting of hydrazine, ethylenediamine, 1,2-propanediamine, 1,3-propanediamine, 2-methyl-1,5-pentanediamine, 1,3-pentanediamine, 1,3-cyclohexanediamine, 1,2-diaminobutane, 1,3-diaminobutane, 1-amino-3,3,5-trimethyl-5-aminomethylcyclohexane, 2,2-dimethyl-1,3-diaminopropane, 1,3-diamino-2,2-dimethylbutane, 2,4-diamino-1-methylcyclohexane, and mixtures thereof.

11. The process of claim 9 wherein the spinning step to form spandex is a dry-spinning step and the poly(tetramethylene-co-ethyleneether) glycol has a number-average molecular weight of about 650 to about 4000 Dalton.

12. Spandex comprising a reaction product of:
   (a) a poly(tetramethylene-co-ethyleneether) glycol consisting of constituent units derived by copolymerizing tetrahydrofuran and ethylene oxide wherein the portion of units derived from ethylene oxide is present in the poly(tetramethylene-co-ethyleneether) glycol from about 50 to about 70 mole percent;
   (b) at least one diisocyanate;
   (c) at least one diamine chain extender; and
   wherein the spandex has an unload power at 100% elongation of at least 0.018 g/denier.

13. Spandex comprising a reaction product of:
   (a) a poly(tetramethylene-co-ethyleneether) glycol consisting of constituent units derived by copolymerizing tetrahydrofuran and ethylene oxide wherein the portion of units derived from ethylene oxide is present in the poly(tetramethylene-co-ethyleneether) glycol from about 50 to about 70 mole percent;
   (b) at least one diisocyanate;
   (c) one or more diamine chain extenders; and
   wherein the chain extender comprises one or more diamines and wherein the spandex has a retractive force at 100% elongation of at least 0.017 g/denier and a load power at 100% elongation less than 0.106 g/denier.

14. Spandex comprising a reaction product of:
(a) a poly(tetramethylene-co-ethyleneether) glycol consisting of constituent units derived by copolymerizing tetrahydrofuran and ethylene oxide wherein the portion of units derived from ethylene oxide is present in the poly(tetramethylene-co-ethyleneether) glycol from about 50 to about 70 mole percent;
(b) at least one diisocyanate;
(c) one or more diamine chain extenders; and
wherein the chain extender comprises one or more diamines and wherein the spandex has a retractive force at 200% elongation of at least 0.0341 g/denier and a load power at 200% elongation less than 0.16 g/denier.

15. Spandex comprising a reaction product of:
(a) a poly(tetramethylene-co-ethyleneether) glycol consisting of constituent units derived by copolymerizing tetrahydrofuran and ethylene oxide wherein the portion of units derived from ethylene oxide is present in the poly(tetramethylene-co-ethyleneether) glycol from about 50 to about 70 mole percent;
(b) at least one diisocyanate;
(c) one or more diamine chain extenders; and
wherein the chain extender comprises one or more diamines and wherein the spandex has a retractive force at 200% elongation of at least 0.0341 g/denier and a load power at 300% elongation less than 0.227 g/denier.

16. Spandex comprising a reaction product of:
(a) a poly(tetramethylene-co-ethyleneether) glycol consisting of constituent units derived by copolymerizing tetrahydrofuran and ethylene oxide wherein the portion of units derived from ethylene oxide is present in the poly(tetramethylene-co-ethyleneether) glycol from about 50 to about 70 mole percent;
(b) at least one diisocyanate;
(c) one or more diamine chain extenders; and
wherein the chain extender comprises one or more diamines and wherein the spandex has a tenacity of at least 0.495 g/denier and a load power at 200% elongation less than 0.16 g/denier.

17. Spandex comprising a polyurethane reaction product of:
(a) poly(tetramethylene-co-ethyleneether) glycol comprising constituent units derived by copolymerizing tetrahydrofuran and ethylene oxide wherein the portion of units derived from ethylene oxide is present in the poly(tetramethylene-co-ethyleneether) glycol from about 50 to about 70 mole percent;
(b) at least one diisocyanate; and
(c) at least one diamine chain extender;
(d) a polymeric glycol selected from the group consisting of a poly(tetramethylene ether) glycol, a poly(tetramethylene-co-2-methyltetramethyleneether) glycol, a poly(ethylene ether) glycol, a poly(propylene ether) glycol, a polycarbonate glycol, a polyester glycol, and combinations thereof;
wherein the spandex is spun at a speed in excess of about 750 meters per minute.

18. The spandex of claim 17, wherein the polymeric glycol is poly(ethylene ether) glycol and wherein the combined poly(tetramethylene-co-ethyleneether) glycol and poly(ethylene ether) glycol in the spandex has an overall percentage of units derived from ethylene oxide from about 35 to about 70 mole percent.

19. The spandex of claim 17, wherein the polymeric glycol is selected from the group consisting of a poly(tetramethylene ether) glycol, a poly(tetramethylene-co-2-methyltetramethyleneether) glycol, a poly(propylene ether) glycol, a polycarbonate glycol, a polyester glycol, or combinations thereof and wherein the combined poly(tetramethylene-coethyleneether) glycol and the polymeric glycol has an overall percentage of units derived from ethylene oxide less than or equal to about 35 mole percent.

* * * * *